(No Model.)
W. S. BELDING.
LATHE FOR MAKING ARMATURES.
No. 415,805. Patented Nov. 26, 1889.
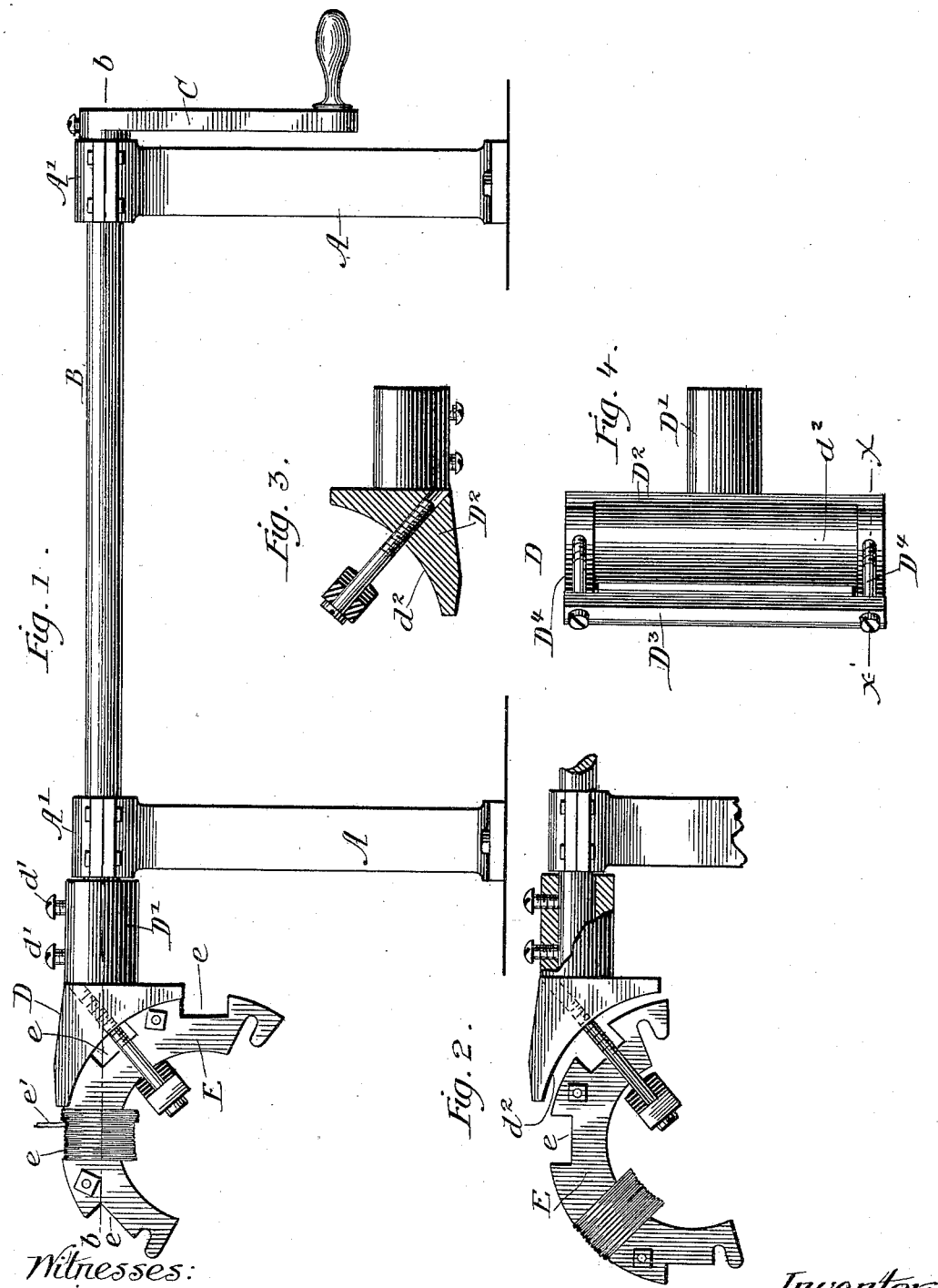

UNITED STATES PATENT OFFICE.

WARREN S. BELDING, OF ENGLEWOOD, ASSIGNOR TO THE BELDING MOTOR AND MANUFACTURING COMPANY, OF CHICAGO, ILLINOIS.

LATHE FOR WINDING ARMATURES.

SPECIFICATION forming part of Letters Patent No. 415,805, dated November 26, 1889.

Application filed July 5, 1889. Serial No. 316,519. (No model.)

*To all whom it may concern:*

Be it known that I, WARREN S. BELDING, a citizen of the United States, residing at Englewood, in the county of Cook and State of Illinois, have invented certain new and useful Improvements in Lathes for Winding Armatures; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates particularly to a lathe to be used for winding the coils upon the sections of sectional armatures for electric motors and dynamos.

The object is to provide for securing the particular portion of the section to be wound accurately into an axis of rotation, so that the wire may be wound upon said part as upon a reel. To this end I have devised a chuck for holding said sections, as hereinafter described, and specified in the claims.

In the accompanying drawings, Figure 1 is a side elevation of a lathe embodying my improvement. Fig. 2 is a partial side elevation of the same. Fig. 3 is a section in line $xx$ of Fig. 4. Fig. 4 is a general view of the chuck.

In said drawings, A A are standards having at their upper ends bearings A', in which is supported a shaft B. C is a crank applied to one end of said shaft for rotating the latter by hand-power. Said shaft may, however, be driven by other power. The opposite end of the shaft B extends beyond its bearing to receive the chuck D. Said chuck consists of the sleeve D', the head $D^2$, the clamping-bar $D^3$, and the clamping-posts $D^4$. The sleeve D' is fitted over the shaft B, and secured immovably thereto by one or more screws $d'$ or otherwise, so that said chuck will rotate with the shaft B. The head $D^2$ extends outward from the sleeve D' in the produced axis of rotation of the shaft B. Such axis of rotation is indicated by $b\ b$. The width of said head in a direction at right angles to the axis of rotation is greater than the width of the armature-section to be wound, so that the latter may be applied to said head between the clamping-posts, as hereinafter described. The portion of said head opposite the sleeve D' and the shaft B has an oblique concave face $d^2$, conforming to the surface of a segment of a cylinder about equal to the diameter of the armature to be wound, the axis of such segment being regarded as at right angles to and away from the produced axis of the shaft B.

E is a section of an armature to be wound. The degree of obliquity of the face $d^2$ with reference to the produced axis of the shaft B is such as to bring the middle of the armature-section immediately in front of said head into the axis of rotation. This is clearly shown in Fig. 1. The section E is there so applied to the head as to bring one of the bobbin-spaces $e$ immediately in front of said head, and it is seen that the produced axis of the shaft B extends through the middle or axis of said bobbin-space, so that the axis of said bobbin-space and the produced axis of said shaft are made to coincide. It is obvious that if the shaft B is now rotated the said bobbin-space of the section E will be rotated accurately upon its own axis, and the wire $e'$ may be wound upon said bobbin-space as upon a reel or spool. Since the face $d^2$ and the outer face of the armature-section are substantially alike, it follows that the section E may now be moved upon said face sufficiently to bring another bobbin-space $e$ into the produced axis of the shaft B in front of said head, so that said other bobbin-space may be wound as was the previous one. Thus one bobbin-space after another may be wound until the entire section is completed. While the winding is performed the section must be firmly secured to the head. For this purpose I have provided the clamping-bar $D^3$ and the clamping-posts $D^4$. Said clamping-bar is arranged to lie across the inner face of the section E, parallel to the axis of the latter, and the clamping-posts $D^4$ extend through the ends of said clamping-bar into the ends of the head $D^2$. Said clamping-posts may be formed as screw-bolts or otherwise, so as to draw said clamping-bar firmly against the section of the armature. The drawings show said post as screw-bolts extending through the clamping-bar and threaded into the head $D^2$.

Different sizes of the chuck may be made to be applied interchangeably to the lathe.

I claim as my invention—

1. In a lathe for winding the sections of armatures, the combination, with the shaft of such lathe, of a head $D^2$, having the oblique face $d^2$, and means for clamping the armature-sections to said head, substantially as shown and described.

2. In a lathe for winding the sections of armatures, the combination, with the shaft of such lathe, of a head $D^2$, having the oblique face $d^2$, a clamping-bar $D^3$, and clamping-posts $D^4$, joining said clamping-bar to said head, substantially as shown and described.

3. In a lathe for winding armature-sections, the combination, with the shaft of said lathe, of a chuck D, consisting of a sleeve $D'$, head $D^2$, provided with the oblique face $d^2$, clamping-bar $D^3$, and clamping-posts $D^4$, joining said clamping-bar to said head, substantially as shown and described.

4. In a lathe for winding armature-sections, the combination, with the shaft of such lathe, of a head $D^2$, provided with the oblique face $d^2$, clamping-bar $D^3$, and clamping-posts $D^4$, consisting of screw-bolts extending through the ends of said clamping-bar and threaded into the ends of said head, substantially as shown and described.

In testimony whereof I affix my signature, in presence of two witnesses, this 25th day of June, 1889.

WARREN S. BELDING.

Witnesses:
CYRUS KEHR,
GEO. E. FOSS, Jr.